(12) United States Patent
Bollmann

(10) Patent No.: US 8,337,225 B2
(45) Date of Patent: Dec. 25, 2012

(54) BUS BAR CONNECTOR TERMINAL DESIGN

(75) Inventor: Johannes Bollmann, Warendorf (DE)

(73) Assignee: Pollmann Elektrotechnik GmbH, Oelde (DE)

( * ) Notice: Subject to any disclaimer, the term of this patent is extended or adjusted under 35 U.S.C. 154(b) by 316 days.

(21) Appl. No.: 12/798,400

(22) Filed: Apr. 2, 2010

(65) Prior Publication Data

US 2010/0255701 A1    Oct. 7, 2010

(30) Foreign Application Priority Data

Apr. 3, 2009   (DE) .......................... 10 2009 016 087

(51) Int. Cl.
 *H01R 4/66* (2006.01)
(52) U.S. Cl. ...................................................... 439/212
(58) Field of Classification Search .................. 439/212, 439/121
See application file for complete search history.

(56) References Cited

U.S. PATENT DOCUMENTS

| | | | | |
|---|---|---|---|---|
| 4,758,172 A * | 7/1988 | Richards et al. | ............... | 439/212 |
| 4,867,696 A * | 9/1989 | Demler et al. | ................. | 439/212 |
| 5,295,847 A * | 3/1994 | Ozaki et al. | .................... | 439/212 |
| 5,474,475 A * | 12/1995 | Yamaguchi | .............. | 439/620.27 |
| 5,554,040 A * | 9/1996 | Sugiura et al. | ................. | 439/212 |
| 5,938,461 A * | 8/1999 | Biermeier et al. | ............. | 439/212 |
| 6,508,656 B2 * | 1/2003 | Chevassus-More et al. | .. | 439/212 |
| 7,967,622 B2 * | 6/2011 | Brutsch et al. | ................. | 439/212 |
| 2004/0192097 A1 * | 9/2004 | Mills et al. | ..................... | 439/212 |

FOREIGN PATENT DOCUMENTS

| | | |
|---|---|---|
| DE | 36 29 796 | 12/1987 |
| DE | 689 12 040 | 6/1994 |
| DE | 697 04 641 | 8/2001 |
| DE | 602 01 344 | 10/2005 |
| DE | 10 2005 040 310 | 4/2007 |
| EP | 1 916 744 | 4/2008 |

* cited by examiner

*Primary Examiner* — Gary F. Paumen
(74) *Attorney, Agent, or Firm* — Collard & Roe, P.C.

(57) ABSTRACT

A bus bar connector terminal design includes a bus bar having a bus bar housing, on which at least one connector terminal having a terminal housing is attached. The at least one connector terminal has a fixation device for fixation of the at least one connector terminal in a secure position on the bus bar. A bus bar as well as a connector terminal for use in such a bus bar connector terminal design are also provided.

6 Claims, 5 Drawing Sheets

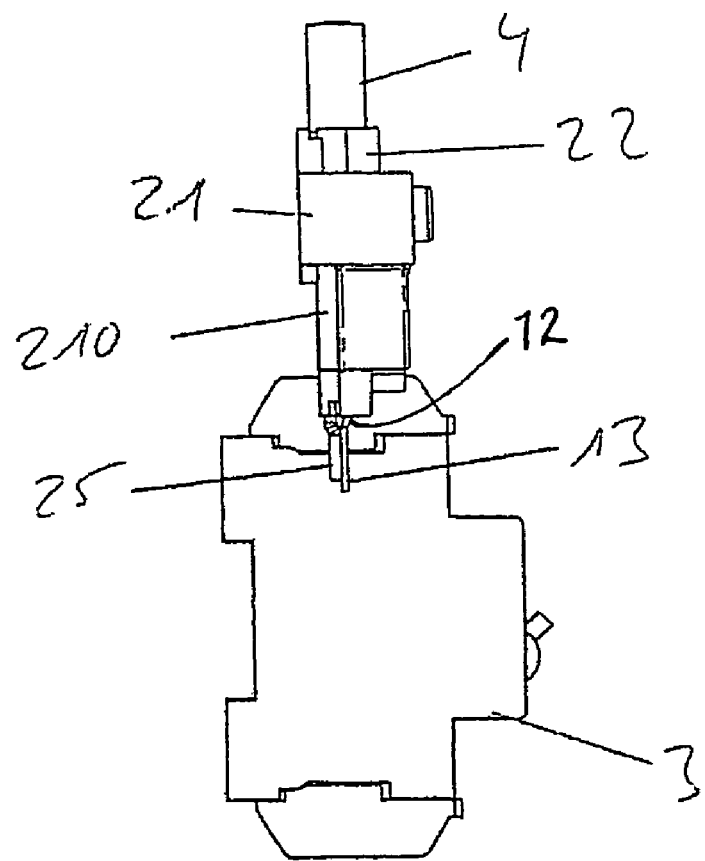

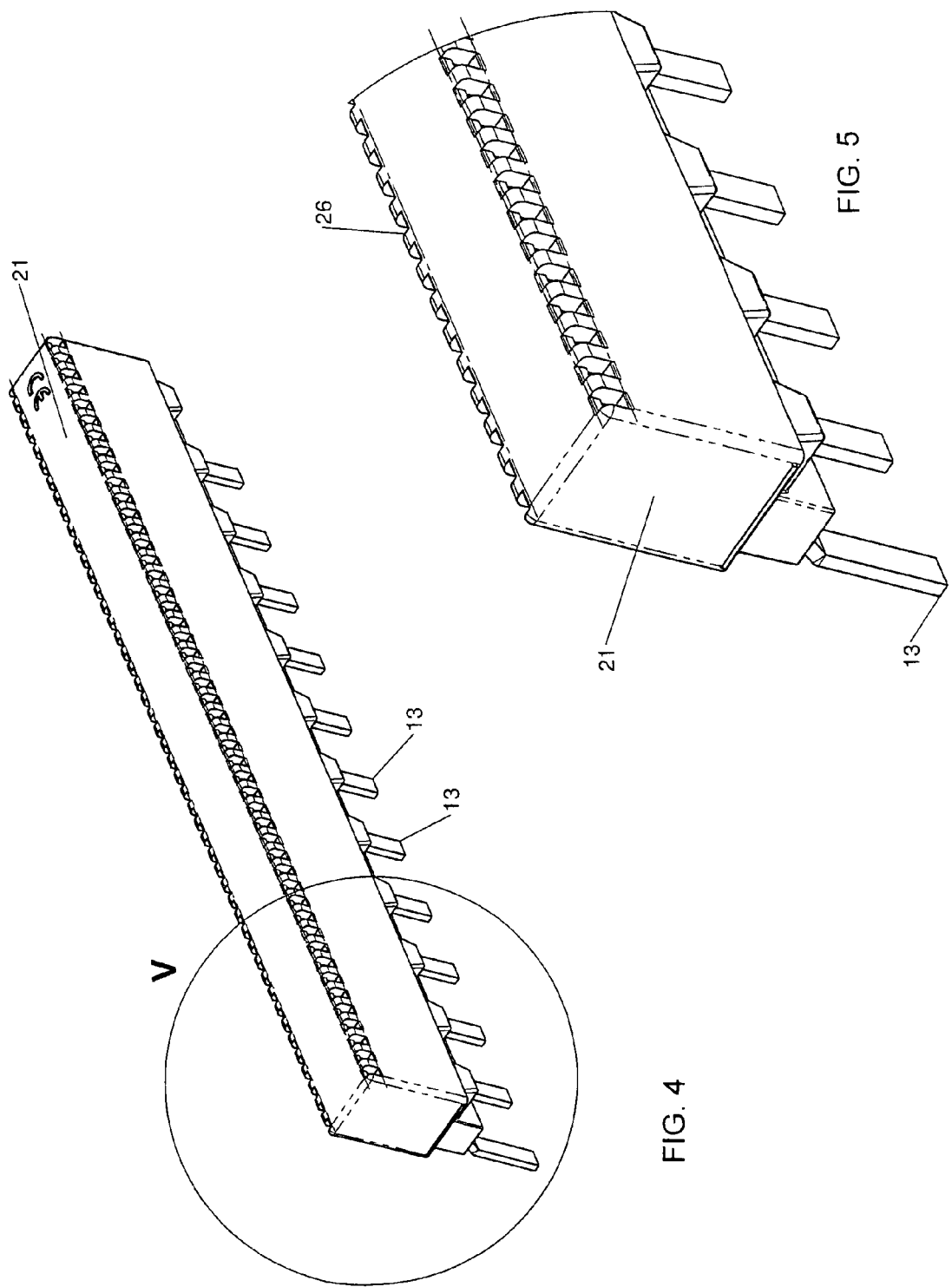

BUS BAR CONNECTOR TERMINAL DESIGN

CROSS REFERENCE TO RELATED APPLICATIONS

Applicant claims priority under 35 U.S.C. §119 of German Application No. 10 2009 016 087.6 filed Apr. 3, 2009.

BACKGROUND OF THE INVENTION

1. Field of the Invention

The invention relates to a bus bar connector terminal design including a bus bar having a bus bar housing, on which at least one connector terminal having a terminal housing is attached. The invention furthermore relates to a bus bar for use in a bus bar connector terminal design, as well as a connector terminal for use in a bus bar connector terminal design.

2. The Prior Art

Bus bar connector terminal designs are known in various embodiments. In this connection, one or more pole bars are disposed in a bus bar housing, and serial installation devices such as automatic circuit breakers can be connected with them. Connector terminals serve to connect lines to the at least one pole bar, which terminals have a connector lug for a connection to the bus bar. The connector lug is usually introduced into a clamping location of the serial installation device, together with a contact lug of the pole bar, in that the two lugs are jointly pressed against one another by means of a clamping connection, and thereby contacted. The connection of the connection line to the connector terminal takes place by way of a clamping body situated in the connector terminal. In this body, clamping regularly takes place by way of a screw by which the connection line can be pressed against the connector lug.

Connector terminals are particularly used when greater line cross-sections are used because of high currents, and these lines can no longer be clamped against the terminal of the serial installation device together with the bar contact. Furthermore, such connector terminals are used if clamping of two conductors in a clamp is not possible or not permissible.

It is a disadvantage of the previously known designs that in particular when stiff lines having a large cross-section are being connected, the forces that act on the connector terminal during the course of assembly can cause changes in position, particularly twisting or tilting of the connector terminal. This twisting or tilting can result in deformation of connector terminal and/or bus bar.

SUMMARY OF THE INVENTION

To provide a remedy for these disadvantages, it is an object of the invention to improve the stability of the connector terminal, particularly when connecting lines.

According to the invention, these and other objects are achieved by a bus bar connector terminal design having at least one connector terminal attached to the bus bar wherein the at least one connector terminal has means for fixation, in a secure position, on the bus bar. Forces that act on the connector terminal can be absorbed by means of fixation, in a secure position, of the connector terminal on the bus bar, because the bending rigidity of the connector terminal in its position is supported. The solution created in this manner demonstrates the advantage that when the force is introduced into the bus bar system, the mechanical stress on a connector terminal of a serial installation device can be mechanically distributed over multiple terminals.

The "fixation in a secure position" forms a significant component of an attachment in a secure position after connection of a serial installation device, formed by the attachment point of the clamping of the connector lug via the serial installation device, and the fixation means of the connector terminals.

In an embodiment of the invention, the means for fixation in a secure position comprise at least one extension that surrounds the bus bar. This extension serves to support the connector terminal on the bus bar and can both engage into a recess such as a groove of the bus bar, for example, or enclose it, in part or even in whole. Complete enclosure requires the placement of at least one articulation on the extension, which can be provided with an engagement device, by means of which the complete enclosure can be fixed in place.

In another embodiment of the invention, the bus bar and the at least one connector terminal have means that correspond with one another, for fixation, in a secure position, of the at least one connector terminal on the bus bar. Preferably, elevations and/or depressions are disposed on the bus bar housing, which correspond to depressions and/or elevations disposed on the terminal housing. A shape fit can be achieved by way of the shape-fit connection of the elevations and depressions of bus bar housing and terminal housing. By means of this shape fit, the forces and/or moments that are exerted can be transferred to the bus bar. In this way, it is prevented that application of a torque when connecting a line can cause the connector terminal to twist or tilt.

Preferably, at least one tooth mechanism is disposed on the bus bar housing, into which at least one projection or extension disposed on the terminal housing engages. Such a tooth mechanism makes it possible to distribute tightening torques from the terminal of the serial installation device to a larger device unit.

In an embodiment of the invention, the at least one tooth mechanism is introduced on at least one longitudinal edge of the bus bar housing. In this way, variable positioning of the connector terminal on the bus bar is made possible, with simple handling.

In another aspect, these and other objects are achieved by means of a bus bar including a bus bar housing in which at least one pole bar is disposed, wherein means for fixation, in a secure position, of a connector terminal are disposed on the bus bar housing. In this connection, the bus bar preferably has a tooth mechanism on at least one longitudinal edge, which can preferably be configured in regular manner. The regular configuration of the tooth mechanism allows variable placement of connector terminals having different widths on uniform bus bars.

In a further aspect, these and other objects are achieved by means of a connector terminal for use in the bus bar connector terminal design, wherein at least one extension is disposed on the terminal housing, which is suitable for at least partly surrounding the bus bar or wherein at least one projection for introduction into a corresponding recess of the bus bar or a recess for accommodating a corresponding projection of the bus bar is disposed on the terminal housing. By means of the extension disposed on the terminal housing, support of the connector terminal on the bus bar is made possible. The projection or recess disposed on the terminal housing allows a shape-fit connection with a corresponding recess or projection of the bus bar. As a result, forces or torques that act on it are allowed to be passed on to the bus bar.

Other further developments and embodiments of the invention are discussed below.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 is a side view of the bus bar connector terminal design from FIG. 1;

FIG. 4 is a spatial representation of the bus bar of the assembly according to FIG. 1;

FIG. 5 is a detailed representation of the detail V from FIG. 4;

DETAILED DESCRIPTION OF PREFERRED EMBODIMENTS

Figure 1:
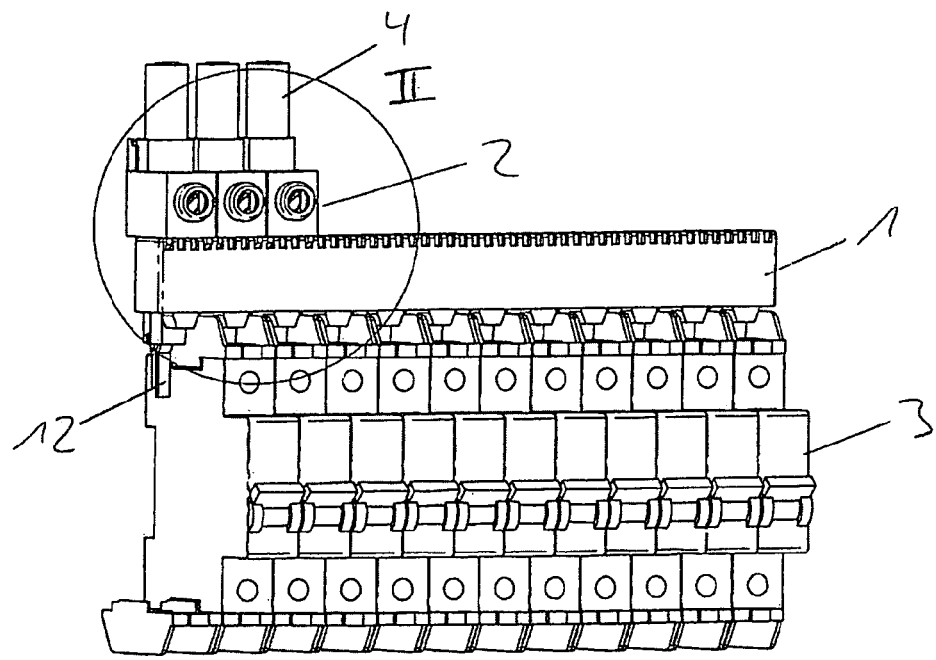
FIG. 1 is a spatial representation of a bus bar connector terminal design with automatic circuit breakers disposed on it.

Referring now in detail to the drawings, FIG. 1 shows an exemplary embodiment of a bus bar connector terminal design which consists essentially of a bus bar 1 that accommodates connector terminals 2.

Figure 2:
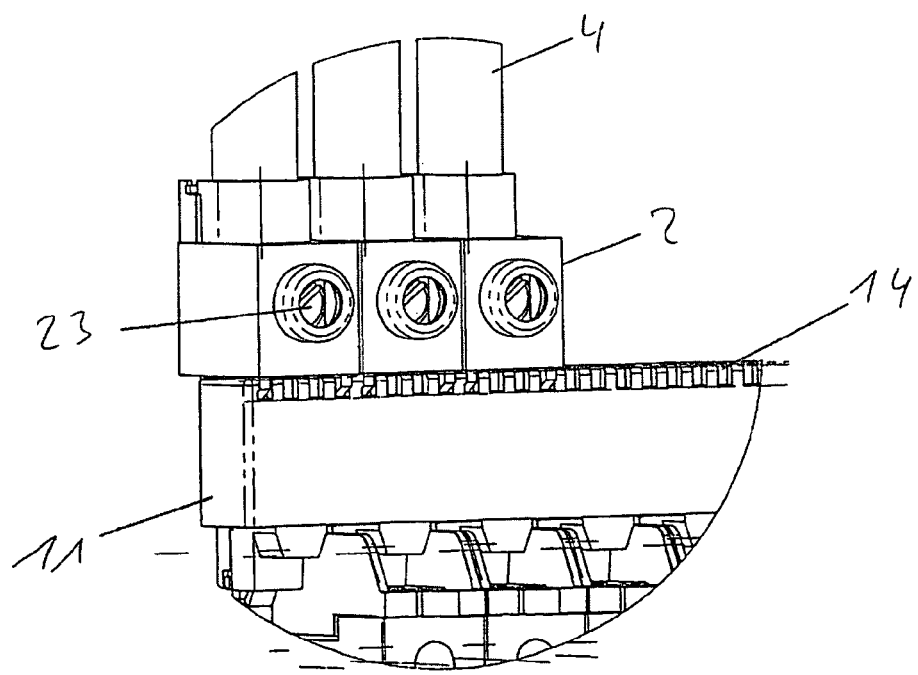
FIG. 2 is a detailed representation of the detail II in FIG. 1.
Figure 6:
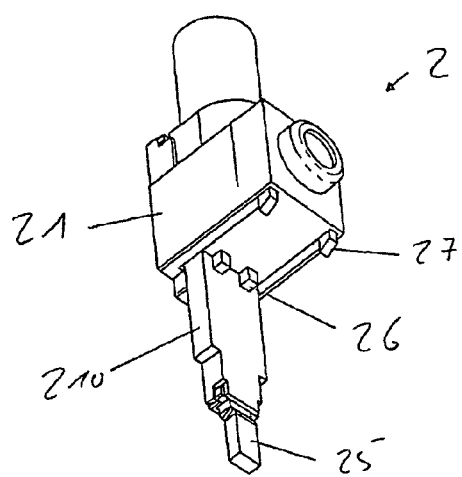
FIG. 6 is a spatial representation of a connector terminal.

Bus bar 1 comprises a bus bar housing 11 (FIG. 2) in which a pole bar 12 is disposed in the exemplary embodiment. Of course, bus bar housing 11 can also be provided with multiple pole bars 12. Pole bar 12 has contact lugs 13 (FIG. 3) for connecting serial installation devices such as automatic circuit breakers 3, spaced apart in the longitudinal direction. A connector terminal 2 is connected to a contact lug 13 of pole bar 12, in each instance, which lug serves to feed in current or voltage. On its side facing away from the automatic circuit breaker 3, two sets of teeth 14 are introduced into bus bar housing 11. In this connection, teeth 14 are disposed to lie opposite one another on the longitudinal side edges of bus bar housing 11. Teeth 14 are configured in the form of recesses configured essentially in block shape and spaced regularly apart from one another.

Figure 7:
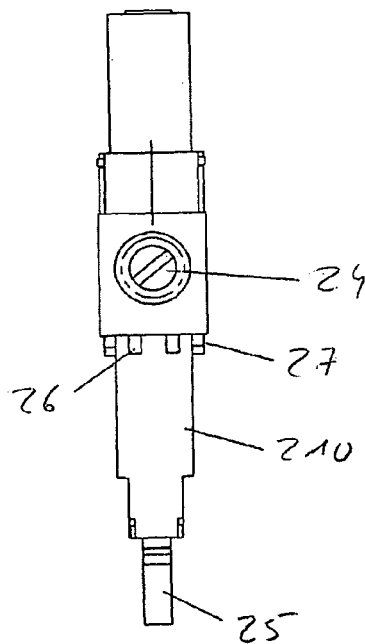
FIG. 7 is a front view of the connector terminal from FIG. 6.
Figure 8:
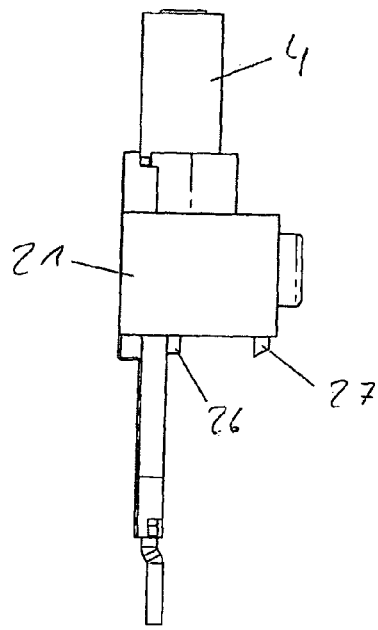
FIG. 8 is a side view of the connector terminal from FIG. 6.
Figure 10:
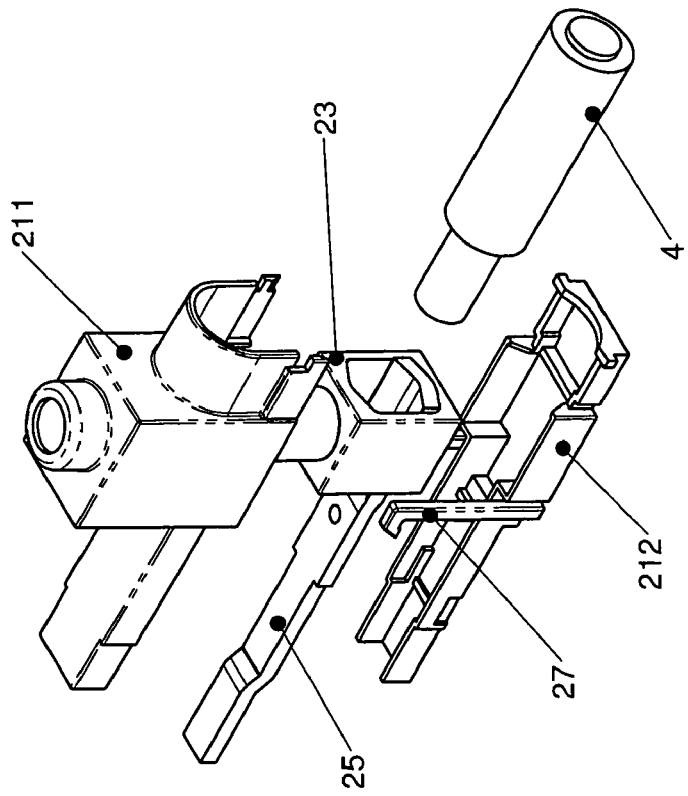
FIG. 10 is a back exploded view of the connector terminal from FIG. 6.
Figure 9:
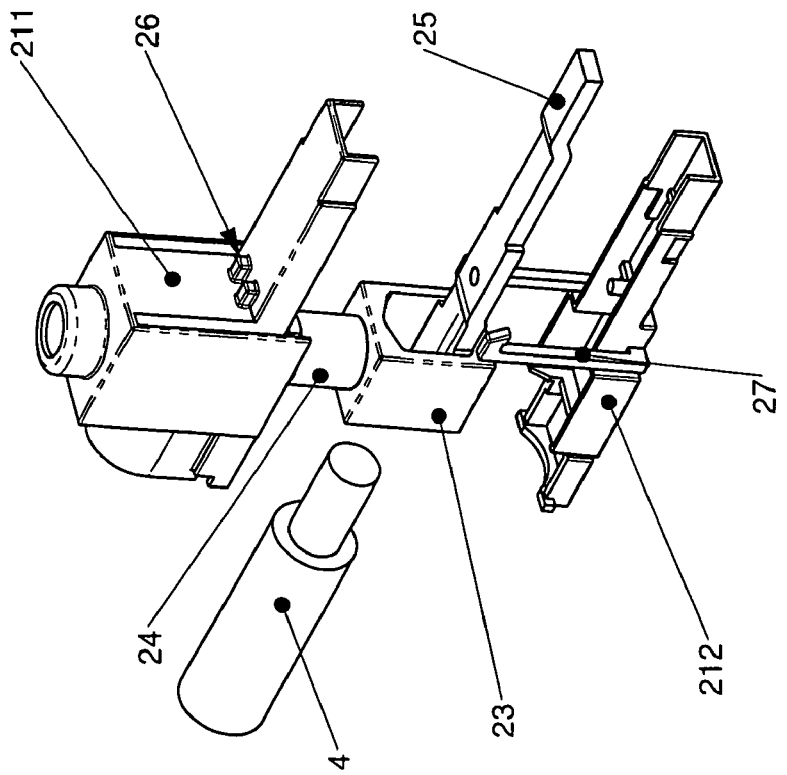
FIG. 9 is a front exploded view of the connector terminal from FIG. 6.

Connector terminals 2 have a terminal housing 21 made of plastic, in each instance, which is formed from a front part 211 and a back part 212 (FIGS. 9-10) and has an opening 22 for the introduction of a connector cable 4 on its side facing away from the bus bar. Opening 22 opens into a conductive clamping body 23 disposed in the interior of terminal housing 21, in which body the connector cable can be contacted with clamping body 23 by way of a clamping screw 24 (FIG. 7). Clamping screw 24, which is disposed in the interior of terminal housing 21, can be tightened or released, respectively, by means of a screwdriver, through a screwdriver insertion opening provided in terminal housing 21.

Connector terminal 2 has a connector lug 25 that is conductively connected with clamping body 23 in the interior of terminal housing 21, whereby connector lug 25 projects out of the guide shoe 210 formed onto terminal housing 21.

On its side facing bus bar 1, two tooth mechanisms are formed onto terminal housing 21, spaced apart from one another. In this connection, one tooth mechanism row lies against a guide shoe 210 for the connector lug 25 that is formed onto terminal housing 21. This tooth mechanism is formed by means of projections 26 that are essentially block-shaped and formed onto terminal housing 21. The second tooth mechanism row is disposed spaced apart from the first one, on terminal housing 21, and is formed by extensions 27 positioned apart from one another, which are formed onto back part 212 of terminal housing 21 and have slanted projections at their ends. The distance between the projections of the two tooth mechanisms is selected to be different in the exemplary embodiment.

Connector terminal 2 is connected with bus bar 1 in such a manner that the tooth mechanisms of terminal housing 21 of connector terminal 2 formed by projections 26 and extensions 27 engage into teeth 14 of bus bar housing 11 of bus bar 1. In this connection, connector lug 25 of connector terminal 2, which is guided in guide shoe 210 of terminal housing 21, lies against contact lug 13 of pole bar 12 of bus bar 1. For this purpose, connector lug 25 is configured to be angled in the direction of clamping screw 24.

In the assembled state, bus bar housing 11 lies against guide shoes 210 of connector terminals 2, whereby projections 26 of connector terminals 2 engage into teeth 14 of bus bar 1, whereby terminal housings 21 lie on bus bar housing 11.

By means of the reciprocal teeth and tooth systems of bus bar housing 11 and terminal housing 21, respectively connector terminals 2 are connected with bus bar 1 with shape fit, in a secure position, when the serial installation device 3 has been connected at its terminals. By means of the position-stable arrangement, additional support of connector terminals 2, which are disposed next to one another, provided by one to the other, is possible. For this purpose, shape-fit connection means that correspond to one another, such as guide rails, for example, can additionally be formed onto terminal housing 21 laterally, in known manner.

Although only at least one embodiment of the present invention has been shown and described, it is to be understood that many changes and modifications may be made thereunto without departing from the spirit and scope of the claims.

What is claimed is:

1. A bus bar connector terminal design comprising:
    (a) a bus bar having a bus bar housing in which at least one pole bar is disposed, said pole bar having contact lugs that are spaced apart in a longitudinal direction; and
    (b) at least one connector terminal attached to the bus bar, said at least one connector terminal having a terminal housing with a clamping body from which a connector lug projects, said connector lug being conductively connected with the clamping body, wherein the contact lugs and the connector lugs lie against one another and are connected to a serial connection device; and
    (c) a fixation device for fixing the at least one connector terminal in a secure position on the bus bar, the fixation device being formed by at least one tooth mechanism disposed on the bus bar housing, into which at least one projection or extension disposed on the terminal housing engages.

2. The bus bar connector terminal design according to claim 1, wherein the at least one tooth mechanism is introduced on at least one longitudinal edge of the bus bar housing.

3. A bus bar for use in a bus bar connector terminal design comprising:
    (a) a bus bar housing;
    (b) at least one pole bar disposed in the bus bar housing, said pole bar having contact lugs that are spaced apart in a longitudinal direction; and
    (c) a fixation device disposed on the bus bar housing for fixation of a connector terminal in a secure position on the bus bar housing, said fixation device comprising at least one tooth mechanism introduced into the bus bar housing for a shape-fit connection with corresponding projections or extensions respectively, disposed on the connector terminal.

4. The bus bar according to claim 3, wherein the at least one tooth mechanism is disposed on at least one longitudinal edge of the bus bar housing.

5. The bus bar according to claim 4, wherein the at least one tooth mechanism is configured in regular manner.

6. The bus bar according to claim 3, wherein the at least one tooth mechanism is disposed on a back portion of the bus bar housing facing away from the at least one pole bar.

* * * * *